United States Patent
Aragaki

(10) Patent No.: US 10,168,526 B2
(45) Date of Patent: Jan. 1, 2019

(54) CELL CONTOUR FORMATION APPARATUS AND METHOD OF THE SAME, AND NON-TRANSITORY COMPUTER READABLE STORAGE MEDIUM STORING A CELL CONTOUR FORMATION PROGRAM

(71) Applicant: OLYMPUS CORPORATION, Tokyo (JP)

(72) Inventor: Hideya Aragaki, Akishima (JP)

(73) Assignee: OLYMPUS CORPORATION, Tokyo (JP)

(*) Notice: Subject to any disclaimer, the term of this patent is extended or adjusted under 35 U.S.C. 154(b) by 863 days.

(21) Appl. No.: 14/317,856

(22) Filed: Jun. 27, 2014

(65) Prior Publication Data

US 2014/0307079 A1   Oct. 16, 2014

Related U.S. Application Data

(63) Continuation of application No. PCT/JP2012/083134, filed on Dec. 20, 2012.

(30) Foreign Application Priority Data

Dec. 28, 2011   (JP) .................................. 2011-287899

(51) Int. Cl.
*G06T 7/12*   (2017.01)
*G06K 9/00*   (2006.01)
(Continued)

(52) U.S. Cl.
CPC .......... *G02B 21/367* (2013.01); *G06K 9/0014* (2013.01); *G06K 9/34* (2013.01);
(Continued)

(58) Field of Classification Search
CPC ............ G06T 7/12; G06T 2207/10056; G06K 9/0014
(Continued)

(56) References Cited

U.S. PATENT DOCUMENTS

| 6,785,411 B1* | 8/2004 | Kitajima .................. G06T 7/60 382/133 |
| 2004/0066850 A1* | 4/2004 | Nakajima ................ G06K 9/40 375/240.19 |

(Continued)

FOREIGN PATENT DOCUMENTS

| JP | 2002-171411 | 6/2002 |
| JP | 2004-054347 | 2/2004 |

(Continued)

OTHER PUBLICATIONS

Japanese Office Action, dated Jan. 19, 2016, issued in corresponding Japanese Patent Application No. 2011-287899.

(Continued)

*Primary Examiner* — Jeffrey A Williams
(74) *Attorney, Agent, or Firm* — Hunton Andrews Kurth LLP

(57) ABSTRACT

An cell contour formation apparatus includes a cell image acquiring unit, a subband image creating unit, a features calculating unit, a correcting unit, a contour forming unit. The subband image creating unit creates subband images including a low frequency image and a high frequency image. The features calculating unit calculates a local texture features from the high frequency image. The correcting unit corrects the high frequency image on the basis of the pixel value of the low frequency image and the texture features. The contour forming unit forms contours of cells included in the cell group on the basis of the corrected high frequency image.

17 Claims, 10 Drawing Sheets

(51) Int. Cl.

| | |
|---|---|
| *G02B 21/36* | (2006.01) |
| *G06T 5/00* | (2006.01) |
| *G06T 5/20* | (2006.01) |
| *G06K 9/34* | (2006.01) |
| *G06K 9/52* | (2006.01) |
| *G06T 7/168* | (2017.01) |
| *G06T 7/42* | (2017.01) |

(52) U.S. Cl.
CPC .............. *G06K 9/522* (2013.01); *G06T 5/002* (2013.01); *G06T 5/20* (2013.01); *G06T 7/12* (2017.01); *G06T 7/168* (2017.01); *G06T 7/42* (2017.01); *G06T 2207/10056* (2013.01); *G06T 2207/30024* (2013.01)

(58) Field of Classification Search
USPC .......................................................... 348/79
See application file for complete search history.

(56) References Cited

U.S. PATENT DOCUMENTS

| | | | |
|---|---|---|---|
| 2006/0262147 A1* | 11/2006 | Kimpe | G09G 3/20 345/690 |
| 2007/0024707 A1* | 2/2007 | Brodsky | G08B 13/1961 348/143 |
| 2007/0059680 A1* | 3/2007 | Kapur | B01L 3/502746 435/4 |
| 2009/0074275 A1 | 3/2009 | O Ruanaidh | |
| 2010/0014718 A1* | 1/2010 | Savvides | G06K 9/00597 382/117 |
| 2010/0098317 A1* | 4/2010 | Kiyuna | G06T 7/0012 382/133 |
| 2012/0237107 A1* | 9/2012 | Tawfik | G06K 9/00127 382/133 |
| 2013/0016886 A1* | 1/2013 | Schoenmeyer | G06T 7/0012 382/128 |
| 2013/0202182 A1* | 8/2013 | Rowe | A61B 10/02 382/133 |

FOREIGN PATENT DOCUMENTS

| | | |
|---|---|---|
| JP | 2005-117549 | 4/2005 |
| JP | 2006-338191 | 12/2006 |
| JP | 2009-534665 | 9/2009 |
| JP | 2010-513902 | 4/2010 |
| JP | 2010-213658 | 9/2010 |
| JP | 2011-255033 | 12/2011 |
| WO | 2008/010375 | 1/2008 |
| WO | 2011/010475 | 1/2011 |
| WO | 2011/024370 | 3/2011 |

OTHER PUBLICATIONS

International Preliminary Report on Patentability, dated Jul. 1, 2014, issued in corresponding International Application No. PCT/JP2012/083134.
International Search Report, dated Apr. 2, 2013, issued in corresponding International Application No. PCT/JP2012/083134.

* cited by examiner

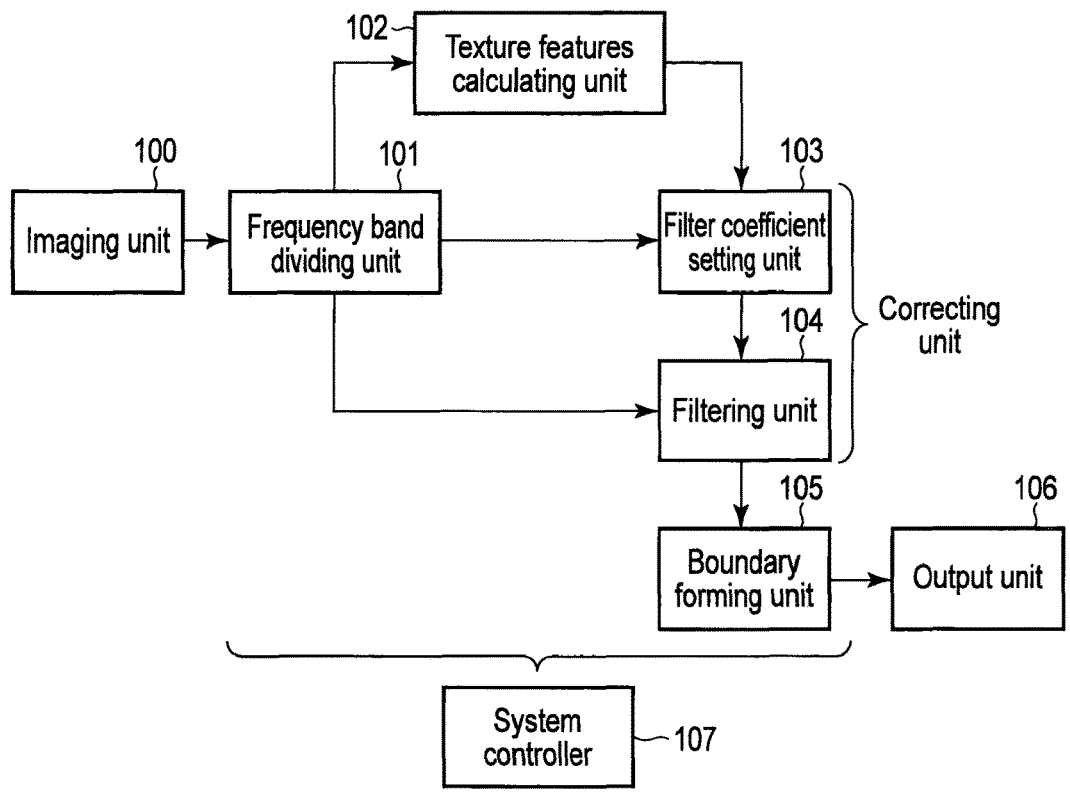
F I G. 1
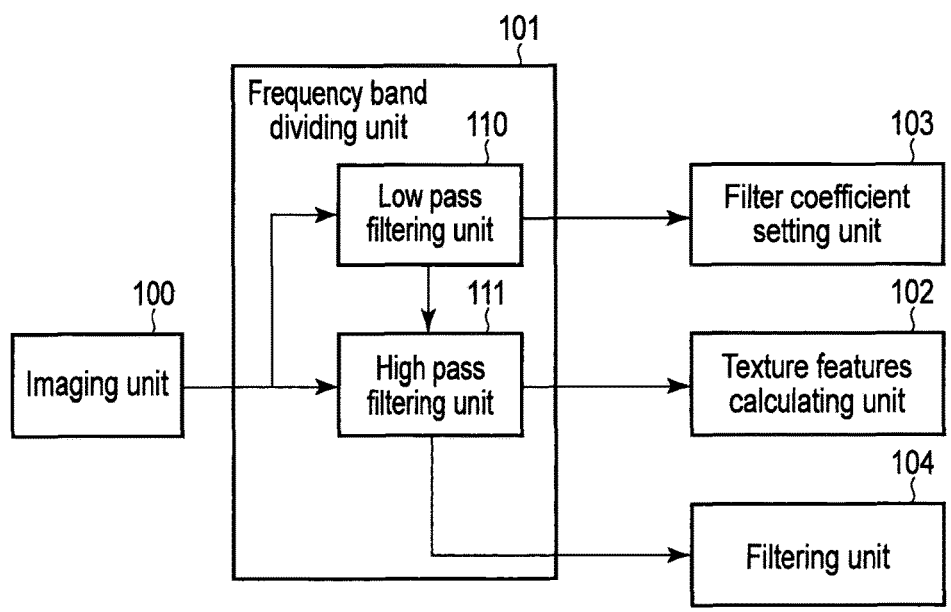
F I G. 2

|   | i−1 | i−2 | i | i+1 | i+2 |
|---|---|---|---|---|---|
| j−2 | 0 | 3 | 0 | 0 | 0 |
| j−1 | 3 | 0 | 0 | 1 | 0 |
| j | 2 | 0 | 1 | 2 | 1 |
| j+1 | 3 | 2 | 2 | 3 | 2 |
| j+2 | 3 | 0 | 0 | 0 | 2 |

Pixel values in region of interest

F I G. 4A

Pixel value Li

Pixel value Lj $\begin{pmatrix} 5 & 1 & 1 & 3 \\ 2 & 0 & 1 & 0 \\ 1 & 1 & 1 & 2 \\ 1 & 0 & 1 & 0 \end{pmatrix}$ Co-occurrence matrix C

F I G. 4B

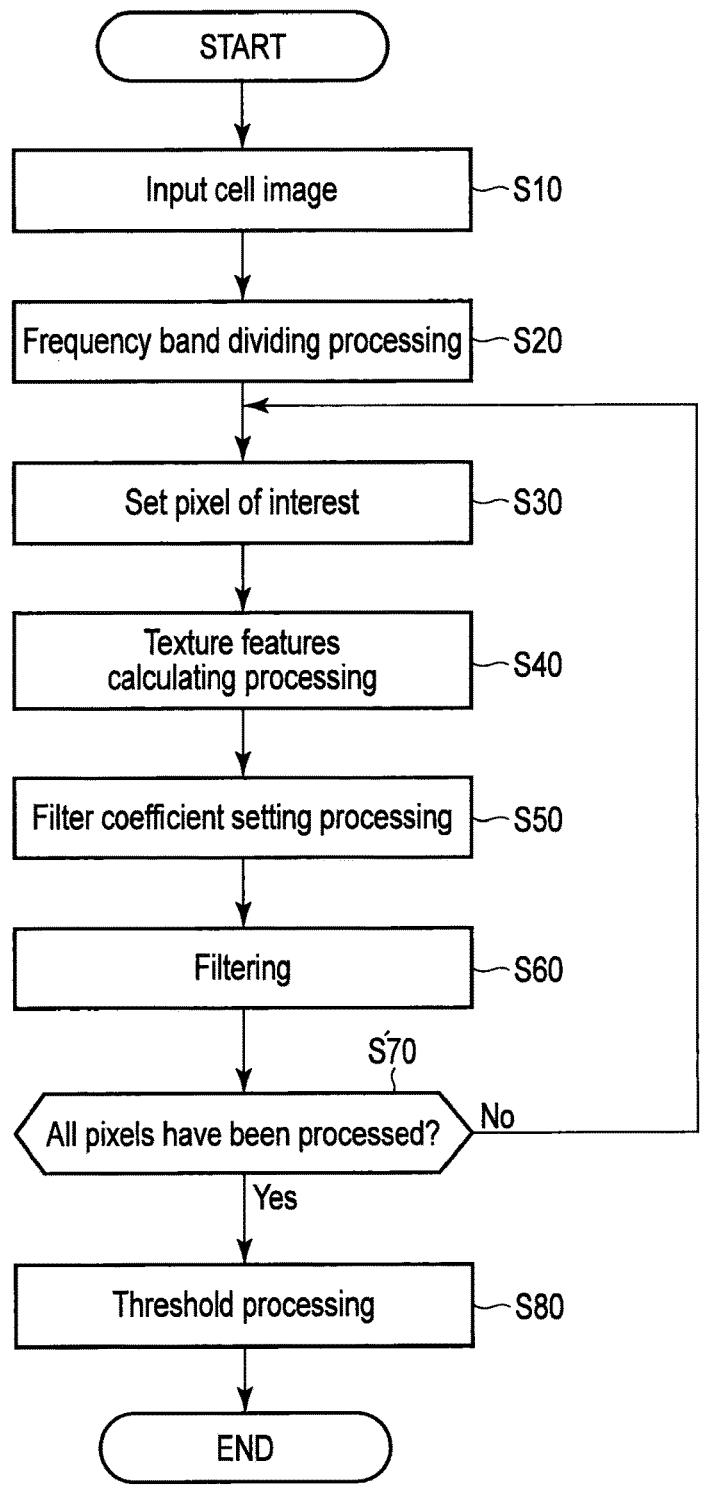
F I G. 6

Rough contour A of adjacent cells

Cell contour H" of adjacent cells

Cell contour H''' after composing

CELL CONTOUR FORMATION APPARATUS AND METHOD OF THE SAME, AND NON-TRANSITORY COMPUTER READABLE STORAGE MEDIUM STORING A CELL CONTOUR FORMATION PROGRAM

CROSS-REFERENCE TO RELATED APPLICATIONS

This application is a Continuation Application of PCT Application No. PCT/JP2012/083134, filed Dec. 20, 2012 and based upon and claiming the benefit of priority from prior Japanese Patent Application No. 2011-287899, Dec. 28, 2011, the entire contents of all of which are incorporated herein by reference.

BACKGROUND OF THE INVENTION

1. Field of the Invention

The present invention relates to a cell contour formation apparatus and a method of the same to extract a contour representing the shape of each cell from a cell image acquired by imaging using, for example, a bright field microscope, and a storage medium to store a computer-processible cell contour formation program.

2. Description of the Related Art

Heretofore, in medical and life-science fields, various cell analyses using cell images photographed through a microscope have been conducted. For example, in the studies of stem cells such as ES cells and iPS cells, operations generally performed for the elucidation of cell differentiation mechanisms and the discovery and development of drugs include observation of cell differentiation processes and morphological feature changes from cell images photographed in a time-series manner, and investigation of differences in cell characteristics.

Regarding the analyses of cell images, automation of troublesome operations such as the screening of individual cells that has heretofore been visually performed is becoming possible by the application of image processing technology such as image recognition. If this image processing technology is applied, it is possible to calculate individual cell contours included in cell images and grasp cell morphological information and populations.

Jpn. Pat. Appln. KOKAI Publication No. 2004-54347 has disclosed a technique regarding cell contour extraction to analyze cell morphological transformation for the purpose of functional analysis of DNA. The technique used in cell contour extraction is a technique for forming a cell contour from a phase difference image photographed by a phase contrast microscope and a fluorescent image photographed by a fluorescence microscope. More specifically, according to the disclosure in Jpn. Pat. Appln. KOKAI Publication No. 2004-54347, first, an image difference is found between a phase difference image and an image obtained by the application of a close-opening filter to the phase difference image, and edge information is thereby created. A gradient vector flow (GVF) is created on the basis of the created edge information. Then the fluorescent image is digitized to create an initial contour. Finally, under the restrictions of the GVF, the snakes (dynamic contour) method is applied to the initial contour to form a cell contour.

BRIEF SUMMARY OF THE INVENTION

A cell contour formation apparatus according to aspect of the present invention comprises a cell image acquiring unit which images a cell group to be observed to acquire a cell image; a subband image creating unit which creates, from the cell image, subband images including a low frequency image comprising low-frequency components and a high frequency image comprising high-frequency components; a features calculating unit which calculates a local texture features from the high frequency image; a correcting unit which corrects the high frequency image on the basis of the pixel value of the low frequency image and the texture features; and a contour forming unit which forms contours of cells included in the cell group on the basis of the corrected high frequency image.

A cell contour formation method according to aspect of the present invention comprises imaging a cell group to be observed to acquire a cell image; creating, from the cell image, subband images including a low frequency image comprising low-frequency components and a high frequency image comprising high-frequency components; calculating a local texture features from the high frequency image; correcting the high frequency image on the basis of the pixel value of the low frequency image and the texture features; and forming contours of cells included in the cell group on the basis of the corrected high frequency image.

A non-transitory computer readable storage medium storing a cell contour formation program according to aspect of the present invention comprises image a cell group to be observed to acquire a cell image; create, from the cell image, subband images including a low frequency image comprising low-frequency components and a high frequency image comprising high-frequency components; calculate a local texture features from the high frequency image; correct the high frequency image on the basis of the pixel value of the low frequency image and the texture features; and forming contours of cells included in the cell group on the basis of the corrected high frequency image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a configuration diagram showing a first embodiment of a cell contour formation apparatus according to the present invention;

FIG. 2 is a specific configuration diagram showing a frequency band dividing unit in the same apparatus;

FIG. 4A is a diagram showing an example of pixel values in a region of interest applied to the same apparatus;

FIG. 4B is a diagram showing an example of a co-occurrence matrix calculated by counting the appearance frequency of an adjacent pixel pair recorded by the same apparatus;

FIG. 6 is a cell contour formation flowchart of the same apparatus;

DETAILED DESCRIPTION OF THE INVENTION

First Embodiment

Figure 3A:
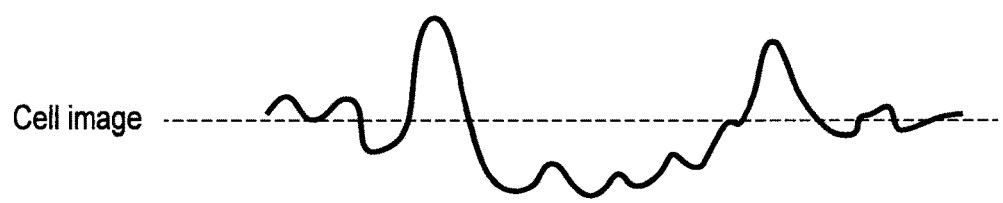
FIG. 3A is a graph showing, in a simplified one-dimensional form, a luminance value distribution of a cell image acquired by an imaging unit in the same apparatus.

Hereinafter, a first embodiment of the present invention will be described with reference to the drawings.

FIG. 1 shows a configuration diagram of a cell contour formation apparatus. The present apparatus includes an imaging unit 100, a frequency band dividing unit 101, a texture features calculating unit 102, a filter coefficient setting unit 103, a filtering unit 104, a boundary forming unit 105, and an output unit 106.

The imaging unit 100 is connected to the frequency band dividing unit 101. The frequency band dividing unit 101 is connected to the texture features calculating unit 102, the filter coefficient setting unit 103, and the filtering unit 104. The texture features calculating unit 102 is connected to the filter coefficient setting unit 103. The filter coefficient setting unit 103 is connected to the filtering unit 104. The filtering unit 104 is connected to the boundary forming unit 105. The boundary forming unit 105 is connected to the output unit 106. Each of the units 100 to 106 is connected to, for example, a system controller 107 by which the operation of each of the units 100 to 106 is controlled.

Each of units 100 to 106 may be composed of, for example, a central processing unit (CPU) and a storage device such as a RAM or a ROM to store a calculation program. A cell contour formation program as the calculation program is stored in the ROM.

The cell contour formation program enables the CPU as a computer to perform a cell image acquiring function to acquire a cell image in which a cell group to be observed is imaged, a subband image creating function to create, from the cell image, subband images including a low frequency image comprising low-frequency components and a high frequency image comprising high-frequency components, a features calculating function to calculate a local texture features from the high frequency image, a correcting function to correct the high frequency image on the basis of the pixel value of the low frequency image and the texture features, and a contour forming function to form contours of cells included in the cell group on the basis of the corrected high frequency image.

The imaging unit 100 images a cell group to be observed to acquire a cell image. The imaging unit 100 includes an image pickup device such as a CCD, and an A/D converter. The imaging unit 100 is based on the assumption that, for example, a camera is attached to a phase contrast microscope to photograph the cell group. However, this is not a limitation. The imaging unit 100 is also applicable to other bright field microscopes such as a differential interference contrast microscope (DIC).

The imaging unit 100 converts a phase difference image of a cell photographed by the phase contrast microscope to a digital signal via an image pickup device such as a CCD, and the A/D converter, and outputs the digital signal as, for example, an 8-bit (256-tone) monochrome original image signal F. The monochrome original image signal F is transferred to the frequency band dividing unit 101.

The phase contrast microscope is a microscope that uses diffraction phenomena of light. The phase contrast microscope is capable of obtaining, as a contrast, a phase difference (optical path difference) of light passing through substances having different refractive indexes, and is therefore suitable for the observation of subjects such as transparent cells or microorganisms. An image photographed through the phase contrast microscope is characterized by the generation of strong contrast celled a halo (artifact) on the boundary between a background region and a sample. The halo appears as aura-like light at the boundary between a background and each cell in a cell image acquired by the phase contrast microscope. The halo is extracted by predetermined edge extracting unit, and a cell contour can be thereby obtained. However, microstructures inside cells and an edge component based on noise tend to be also extracted at the same time, and obtaining a clear contour is difficult.

The present apparatus extracts solely the contour of a cell by taking the texture features and brightness of the cell into account. In the present embodiment, it is assumed that the phase difference image obtained by the phase contrast microscope is a positive contrast image which appears to be photographed so that the background region is bright and a cell region is relatively dark. However, this is not a limitation. In the case of a negative contrast image as well, this phase difference image can be processed in the same manner as the positive contrast image by tone reversal.

The frequency band dividing unit 101 creates, from the cell image, subband images including a low frequency image comprising low-frequency components and a high frequency image comprising high-frequency components. More specifically, the frequency band dividing unit 101 decomposes the monochrome original image signal F into subband images including different frequency band components by predetermined multiple resolution decomposing processing. Here, the frequency band dividing unit 101 decomposes the monochrome original image signal F into two component images: a low frequency image L including low-frequency components in the monochrome original image signal F, and a high frequency image H including a large number of high-frequency components in the monochrome original image signal F.

It is preferable that the low frequency image L has undergone the removal of microstructures, details, and noise present in the background region or inside the cell region in the cell image and includes a large number of frequency subbands that make it easy to show a difference in luminance change between the background region and the cell region.

It is preferable that the high frequency image H includes as many high-frequency components resulting from the edges and halos on the cell contour in the cell image as possible.

FIG. 2 shows a specific configuration diagram of the frequency band dividing unit 101. The frequency band dividing unit 101 includes a low pass filtering unit 110 and a high pass filtering unit 111. Each of input sides of the low pass filtering unit 110 and the high pass filtering unit 111 is connected to the imaging unit 100. The low pass filtering unit 110 is connected to the high pass filtering unit 111 and the filter coefficient setting unit 103. The high pass filtering unit 111 is connected to the texture features calculating unit 102 and the filtering unit 104.

The low pass filtering unit 110 smoothes the cell image to generate the low frequency image L. More specifically, the low pass filtering unit 110 applies a predetermined smoothing filter to smooth the monochrome original image signal F transferred from the imaging unit 100, and transfers the output of the smoothing filter to the filter coefficient setting unit 103 and the high pass filtering unit 111 as the low frequency image L. In the present embodiment, the low pass filtering unit 110 uses a Gaussian filter for the smoothing. However, this is not a limitation. Anything that extracts low-frequency components is applicable to the low pass filtering unit 110.

Figure 3B:
FIG. 3B is a graph showing an example of a luminance value distribution of a low frequency image generated by the frequency band dividing unit in the same apparatus.

FIG. 3A shows, in a simplified one-dimensional form, a luminance value distribution of the cell image acquired by the imaging unit 100. The low pass filtering unit 110 smoothes the original cell image shown in FIG. 3A to generate the low frequency image L shown in FIG. 3B.

The high pass filtering unit 111 subtracts the low frequency image L from the cell image to generate the high frequency image H. More specifically, the high pass filtering unit 111 finds each difference value between corresponding pixel values of the monochrome original image signal F transferred from the imaging unit 100 and the low frequency image L transferred from the low pass filtering unit 110, and transfers each difference value to the texture features calculating unit 102 and the filtering unit 104 as the high frequency image H. As a result, the low frequency image L and the high frequency image H are generated from the monochrome original image signal F.

Figure 3C:
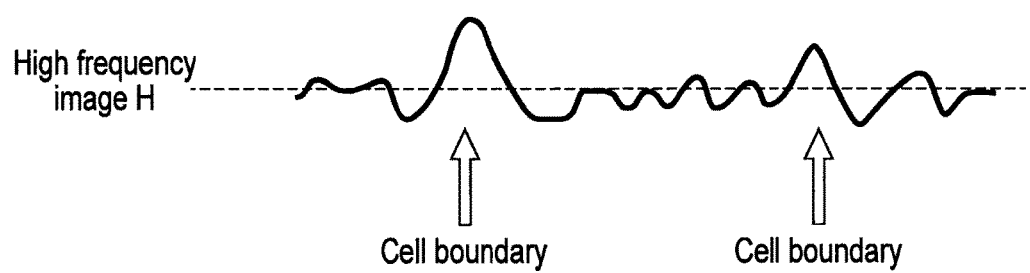
FIG. 3C is a graph showing an example of a luminance value distribution of a high frequency image generated by the frequency band dividing unit in the same apparatus.

FIG. 3C shows an example of a distribution of the luminance values of the high frequency image H generated by subtracting the low frequency image L from the cell image.

In the present embodiment, the monochrome original image signal F is divided into two subbands: the low frequency image L and the high frequency image H. However, this is not a limitation. In the present embodiment, the subbands are decomposed into more details by further multiple resolution decomposition so that the monochrome original image signal F is divided into three or more subband images. In the present embodiment, a subband image in which the luminance changes of the background and the cell region stand out, and a subband image including a large number of edges and halos on the cell contour are selected from three or more subband images by a predetermined condition, for example, by threshold processing based on the contrast and dispersion of pixel values, and these subband images can be applied as the low frequency image L and the high frequency image H.

The texture features calculating unit 102 calculates a local texture features regarding each pixel on the high frequency image H described later. The texture features is a features based on the randomness of a pixel value distribution in the high frequency image H. The texture features is a features based on the complexity of the pixel value distribution in the high frequency image H. The texture features is a features based on a co-occurrence matrix of the pixels in the high frequency image H. As the texture features, it is necessary to select a features that makes it easy to show a difference between the pixel including the high-frequency components in the cell contour on the high frequency image H and the pixel including the high frequency components resulting from microstructures (textures) inside the cells.

In the present embodiment, an entropy which is widely known as a texture analyzing technique and which is one of the features based on a co-occurrence matrix is applied. How to create a co-occurrence matrix regarding a predetermined pixel of interest in the high frequency image H and calculate a texture features entropy is described below.

The co-occurrence matrix is one of widely known statistical techniques to calculate the features of the texture in an image. The co-occurrence matrix represents, in the form of a matrix (co-occurrence matrix), the appearance frequency and probability of a pixel pair located at a certain relative position included in the image. Various texture features can be calculated from the co-occurrence matrix.

First, a tone compression image in which the number of tones is compressed to a predetermined number is created from the high frequency image H to cut down on the size of the co-occurrence matrix and thus reduce a calculated amount. The magnitude of the co-occurrence matrix equals a square matrix of the number of tones×the number of tones. In the present embodiment, the image is compressed to, for example, four tones (pixel values=0 to 3).

A region of interest having a predetermined size around the pixel of interest is then set. In the present embodiment, the size of the region of interest is, for example, 5×5 pixels.

A positional relation $\delta$ of a pixel pair to be extracted from the region of interest is then set. In the present embodiment, a pixel pair adjacent (inter-pixel distance d=1, angle $\theta$=0°) in the horizontal direction is set. The left pixel of the pixel pair is i, and the right pixel is j. Their pixel values are Li and Lj. Note that i=0, 1, 2, 3, . . . , n, and j=0, 1, 2, 3, . . . , m.

The frequencies of appearance of all the adjacent pixel pairs included in the region of interest are then counted, and recorded in a co-occurrence matrix P$\delta$(Li, Lj). That is, in the region of interest, the frequency of the existence of the pixel pair Li and Lj is recorded in the Li row and Lj column of the co-occurrence matrix P$\delta$.

FIG. 4A shows a specific example of pixel values in the region of interest. FIG. 4B shows an example of a co-occurrence matrix calculated in this case. There are two pixel pairs in which Li=3 and Lj=2 in the region of interest shown in FIG. 4A, so that an element of the co-occurrence matrix Pδ(3,2)=2 in FIG. 4B. There are five pixel pairs in which Li=0 and Lj=0 in the region of interest shown in FIG. 4A, so that an element of the co-occurrence matrix Pδ(0,0) =5 in FIG. 4B.

After all the frequencies of the existence of the pixel pairs Li and Lj are recorded, Pδ(Li,Lj) is normalized by the total number of the frequencies of appearance. A texture features is then calculated from a calculated co-occurrence matrix C.

In the present embodiment, an entropy which is the texture features defined by Equation (1) is applied as the texture features. Here, L represents the magnitude (the number of tones) of the matrix. The texture features entropy is an index to measure the randomness of the pixel value distribution, and is lower in value if the pixel values are more randomly included in the region of interest.

$$\text{Entropy} = -\sum_{Li=0}^{L-1}\sum_{Lj=0}^{L-1} P_\delta(Li, Lj)\log\{P_\delta(Li, Lj)\} \quad (1)$$

The texture features entropy calculated for each pixel of the high frequency image H is transferred to the filter coefficient setting unit 103.

In the present embodiment, the entropy is applied as the texture features. However, this is not a limitation. Any features is applicable to the texture features if it makes a difference between the pixels including the high-frequency components in the cell contour included in the high frequency image H and the high-frequency components resulting from microstructures (textures) inside the cells.

There are various definitions of texture featuress that can be calculated from the co-occurrence matrix C. For example, an angular second moment shown below or a reciprocal of a variance is also applicable as the texture features.

The angular second moment is defined as shown in Equation (2). The angular second moment is higher in value if there are a larger number of particular pixel pairs and if the uniformity is higher.

$$\text{Angular second moment} == -\sum_{Li=0}^{L-1}\sum_{Lj=0}^{L-1} P_\delta(Li, Lj)^2 \quad (2)$$

A dispersion is defined as shown in Equation (3). The dispersion is higher in value if there is a greater difference of pixel values included in the region of interest and if the variation and complexity of elements are higher. Conversely, a reciprocal of the dispersion is lower.

$$\text{Dispersion} == \sum_{Li=0}^{L-1}\sum_{Lj=0}^{L-1} |Li - Lj|^2 P_\delta(Li, Lj) \quad (3)$$

The filter coefficient setting unit 103 and the filtering unit 104 correct the high frequency image H on the basis of the pixel value of the low frequency image L and the texture features. The correction in the filter coefficient setting unit 103 and the filtering unit 104 is to filter the high frequency image H on the basis of the pixel value of the low frequency image L and the texture features. The filter coefficient setting unit 103 sets a filter coefficient on the basis of the pixel value of the low frequency image L and the texture features. The filtering unit 104 performs filtering on the basis of the filter coefficient set by the filter coefficient setting unit 103. In the present embodiment, the filtering comprises a nonlinear filter.

More specifically, the filter coefficient setting unit 103 sets a filter coefficient for filtering the high frequency image H in the filtering unit 104, on the basis of the texture features and the pixel value of the low frequency image L. The filter coefficient setting unit 103 sets the filter coefficient so that smoothing effects by the filtering in the filtering unit 104 will be higher, for example, if the value of the texture features is higher and the randomness of the pixel value distribution is higher or if the value of the texture features is lower in uniformity and less in deviation, and if the pixel value of the low frequency image L is lower, that is, lower than the pixel value of the background region.

In the present embodiment, the filtering includes weighting by the texture features entropy and the pixel value of low frequency image based on, for example, the filter coefficient of a bilateral filter to control filter smoothing effects.

The bilateral filter is a filter which is widely known as a nonlinear filter in general. The bilateral filter is used for noise reduction processing as a filter which is capable of removing a slight luminance change while maintaining a global edge structure of an image. A filter coefficient Coef (k+m,l+n) is represented by Equation (4).

Filter Coefficient $$\text{Coef}(k+m, l+n) = \exp((-m^2+n^2)/2\sigma_1^2)\exp\{(H(k,l)-H(k+m,l+n))^2/2\sigma_2^2\} \quad (4)$$

wherein k and l are X and Y coordinate values of the pixel of interest during filtering, and k+m, l+n are X and Y coordinate values of the adjacent pixels included in a region of interest having a predetermined size around the pixel of interest. H(k, l) represents the pixel value of the high frequency image H at the coordinates k, l.

The bilateral filter performs weighting following a Gaussian distribution in accordance with the difference of distance between the pixel of interest and its adjacent pixel, and also performs weighting following a Gaussian distribution in accordance with the difference between the value of the pixel of interest and the value of its adjacent pixel. σ1 represents a standard deviation of the former Gaussian distribution, and σ2 represents a standard deviation of the latter Gaussian distribution.

In the present embodiment, the standard deviation σ1 is controlled by a texture features F(k, l), and the standard deviation σ2 is controlled by a pixel value (brightness) B(k, l) of the low frequency image L. As a result, the filter smoothing effects are adjusted so that the filter smoothing effects will be higher if the texture features is greater, the randomness of the pixel value distribution is higher, and the brightness of the low frequency image L is lower.

The standard deviation σ1 is defined by Equation (5), and the standard deviation σ2 is defined by Equation (6).

$$\sigma 1 = \sigma 1'/F(k,l) \quad (5)$$

$$\sigma 2 = \sigma 2'/B(k,l) \quad (6)$$

wherein σ1' and σ2' are predetermined constants.

The filtering unit 104 filters (convolutes) the high frequency image H from the frequency band dividing unit 101 in accordance with the filter coefficient set in the filter coefficient setting unit 103. After the filtering by the filter coefficient, the filtering unit 104 normalizes by dividing by the total value of the filter coefficients in the region of interest so that the average brightness of the image does not change, and obtains a final filter output. As a result of this filtering, it is possible to suppress the high-frequency components based on the microstructures (textures) inside the cells while leaving the high-frequency components based on the cell contours. A high frequency image H' after the filtering by the filtering unit 104 is transferred to the boundary forming unit 105.

The boundary forming unit 105 performs threshold processing for the high frequency image H' after the correction by the filter coefficient setting unit 103 and the filtering unit 104, and thereby forms a contour of the cell.

More specifically, the boundary forming unit 105 performs digitalization by the threshold processing for the high frequency image H' after the filtering by the filtering unit 104, and forms a cell contour image H" in which the pixels including high frequency components equal to or more than a predetermined threshold constitute cell contours.

Figure 5:
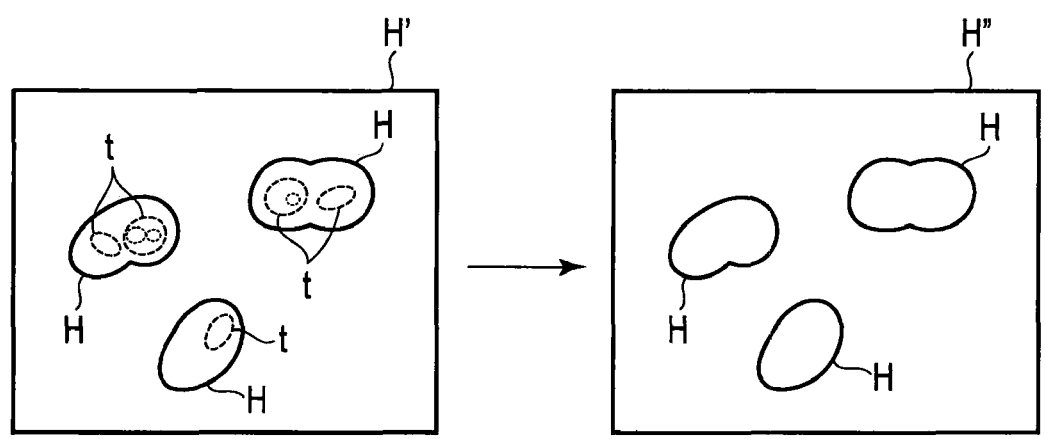
FIG. 5 is a schematic diagram showing a high frequency image including microstructures (textures) inside cells obtained by a boundary formation unit in the same apparatus, and a high frequency image in which the microstructures inside the cells are eliminated.

FIG. 5 shows a schematic diagram of the high frequency image H' including microstructures (textures) inside cells. The high frequency image H' includes microstructures (textures) t inside cells H. If the high frequency image H' is digitalized by threshold processing, the cell contour image H" is formed as cell contours.

The boundary forming unit 105 transfers the cell contour image H" to the output unit 106.

The output unit 106 converts the cell contour image H" to a predetermined image format such as a TIFF format, and then saves the cell contour image H" in a recording medium such as a flash memory.

Now, the operation of the apparatus having the above configuration is described with reference to a cell contour formation flowchart shown in FIG. 6.

The imaging unit 100 converts a phase difference image of a cell group photographed through, for example, the phase contrast microscope to a digital signal via an image pickup device such as a CCD and the A/D converter, and outputs the digital signal as, for example, an 8-bit (256-tone) monochrome original image signal F. The monochrome original image signal F is transferred to the frequency band dividing unit 101.

In step S10, the monochrome original image signal F output from the imaging unit 100 is input to the frequency band dividing unit 101. In step S20, the frequency band dividing unit 101 performs predetermined multiple resolution decomposing processing for the monochrome original image signal F, and decomposes the monochrome original image signal F into subband images including different frequency components, for example, into two component images: a low frequency image L including low-frequency components in the monochrome original image signal F, and a high frequency image H including a large number of high-frequency components in the monochrome original image signal F.

It is preferable that the low frequency image L has undergone the removal of microstructures, details, and noise present in the background region or inside the cell region in the cell image and includes a large number of frequency components that make it easy to show a difference in luminance change between the background region and the cell region. It is preferable that the high frequency image H includes as many high-frequency components resulting from the edges and halos on the cell contour in the cell image as possible.

In step S30, the texture features calculating unit 102 sets a pixel of interest, and a region of interest having a predetermined size around the pixel of interest. In the present embodiment, the size of the region of interest is, for example, 5×5 pixels.

In step S40, the texture features calculating unit 102 calculates a texture features. First, the texture features calculating unit 102 sets positional relation δ of a pixel pair to be extracted from the region of interest.

The texture features calculating unit 102 then counts the frequencies of appearance of all the adjacent pixel pairs included in the region of interest, and records the frequencies of appearance in a co-occurrence matrix Pδ(Li, Lj) shown in FIG. 4B.

After recording all the frequencies of the existence of the pixel pairs Li and Lj, texture features calculating unit 102 then normalizes Pδ(Li, Lj) by the total number of the frequencies of appearance. The texture features calculating unit 102 calculates a texture features from a calculated co-occurrence matrix C. For example, the texture features entropy defined by Equation (1) is applied as the texture features. The texture features entropy calculated for each pixel of the high frequency image H is transferred to the filter coefficient setting unit 103.

In step S50, the filter coefficient setting unit 103 sets a filter coefficient for filtering the high frequency image H in the filtering unit 104, on the basis of the texture features and the pixel value of the low frequency image L. In the present embodiment, as the filtering, weighting by the texture features entropy and the pixel value of low frequency image based on, for example, the filter coefficient of a bilateral filter is performed to control filter smoothing effects.

In the present embodiment, the standard deviational is controlled by a texture features F(k, l), and the standard deviation σ2 is controlled by a pixel value (brightness) B(k, l) of the low frequency image L. As a result of this control, the filter smoothing effects are adjusted so that the filter smoothing effects will be higher if the texture features is greater, the randomness of the pixel value distribution is higher, and the brightness of the low frequency image L is lower. The standard deviation σ1 is defined by Equation (5), and the standard deviation σ2 is defined by Equation (6).

In step S60, the filtering unit 104 filters the high frequency image H output from the frequency band dividing unit 101, that is, filters (convolutes) the high frequency image H in accordance with the filter coefficient set in the filter coefficient setting unit 103.

After the filtering by the filter coefficient, the filtering unit 104 normalizes the filtered image by dividing the filtered image by the total value of the filter coefficients in the region of interest so that the average brightness of the image does not change, and obtains a final filter output. As a result of this filtering, it is possible to suppress the high-frequency components based on the microstructures (textures) inside the cells while leaving the cell contours included in the high-frequency components. A high frequency image H' after the filtering by the filtering unit 104 is transferred to the boundary forming unit 105.

In step S70, the filtering unit 104 checks whether all the pixels of the high frequency image H have been filtered. If there are pixels which have not yet been processed, the filtering unit 104 returns to step S30. If all the pixels have been processed, the filtering unit 104 proceeds to step S80.

In step S80, the boundary forming unit 105 performs threshold processing for the high frequency image H' after the correction by the filter coefficient setting unit 103 and the filtering unit 104, and thereby forms a contour of the cell.

More specifically, the boundary forming unit 105 performs digitalization by the threshold processing for the high frequency image H' after the filtering by the filtering unit 104, and forms a cell contour image H" in which the pixels including high frequency components equal to or more than a predetermined threshold constitute cell contours. The boundary forming unit 105 transfers the cell contour image H" to the output unit 106.

The output unit 106 converts the cell contour image H" to a predetermined image format such as a TIFF format, and then saves the cell contour image H" in a recording medium such as a flash memory.

Thus, according to the first embodiment, a cell group to be observed is imaged to acquire a cell image. A low frequency image L and a high frequency image H are created from the cell group. A local texture features is calculated from the high frequency image H. The high frequency image H is corrected on the basis of the pixel value of the low frequency image L and the texture features. Contours of cells included in the cell group are formed on the basis of the corrected high frequency image H'. That is, contours are formed on the basis of the high frequency components separated from the monochrome original image signal F, and effects of the low frequency components are removed, so that stable contour formation with suppressed influence of brightness unevenness is possible.

Unnecessary high-frequency components are suppressed from the high frequency image H by the filtering based on the texture features calculated from the high frequency image H and the luminance value extracted from the low frequency image L, so that accurate contours can be obtained.

The regions inside cells are lower in luminance than the background region. Therefore, the high-frequency components resulting from microstructures (textures) inside the cells are suppressed on the basis of the average luminance value found from the low frequency image L, so that accurate contours can be obtained.

The frequency band dividing unit 101 includes the low pass filtering unit 110 which smoothest the cell image to generate the low frequency image L, and a high pass filtering unit 111 which subtracts the low frequency image L from the cell image to generate the high frequency image H. Therefore, decomposition into the low frequency image L and the high frequency image H based on the monochrome original image signal F can be rapidly performed by simple processing.

The texture features is a features based on the randomness of a pixel value distribution. Therefore, it is possible to accurately differentiate the cell contour from other high-frequency components on the basis of the randomness of the pixel value distribution.

The texture features is a features based on the complexity of the pixel value distribution. Therefore, it is possible to accurately differentiate the cell contour from other high-frequency components on the basis of the complexity of the pixel value distribution.

The texture features is a features based on the co-occurrence matrix. Therefore, it is possible to accurately differentiate the cell contour from other high-frequency components by the features based on the co-occurrence matrix.

A correcting unit comprising the filter coefficient setting unit 103 and the filtering unit 104 filters the high frequency image H on the basis of the pixel value of the low frequency image L and the texture features. Therefore, it is possible to efficiently correct the high frequency image H on the basis of the pixel value of the low frequency image L and the texture features.

The filtering unit 104 sets the filter coefficient on the basis of the pixel value of the low frequency image L and the texture features. Therefore, the degree of filtering can be controlled so that the high-frequency components unnecessary for the cell contour extraction are effectively suppressed. The filtering is nonlinear filtering, so that complex filtering control that is impossible for the nonlinear filter is possible.

The boundary forming unit 105 forms the cell contour by the threshold processing for the high frequency image H after the filtering. Therefore, the cell contour can be easily and rapidly formed by the simple threshold processing.

The cell image is intended for the image acquired by the bright field microscope, and cell contour extraction is possible in all images by bright field microscopes such as the phase contrast microscope and the DIC.

Second Embodiment

Now, a second embodiment of the present invention is described with reference to the drawings. The same parts as those in FIG. 1 and FIG. 2 are indicated by the same reference signs and are not described in detail.

Figure 7:
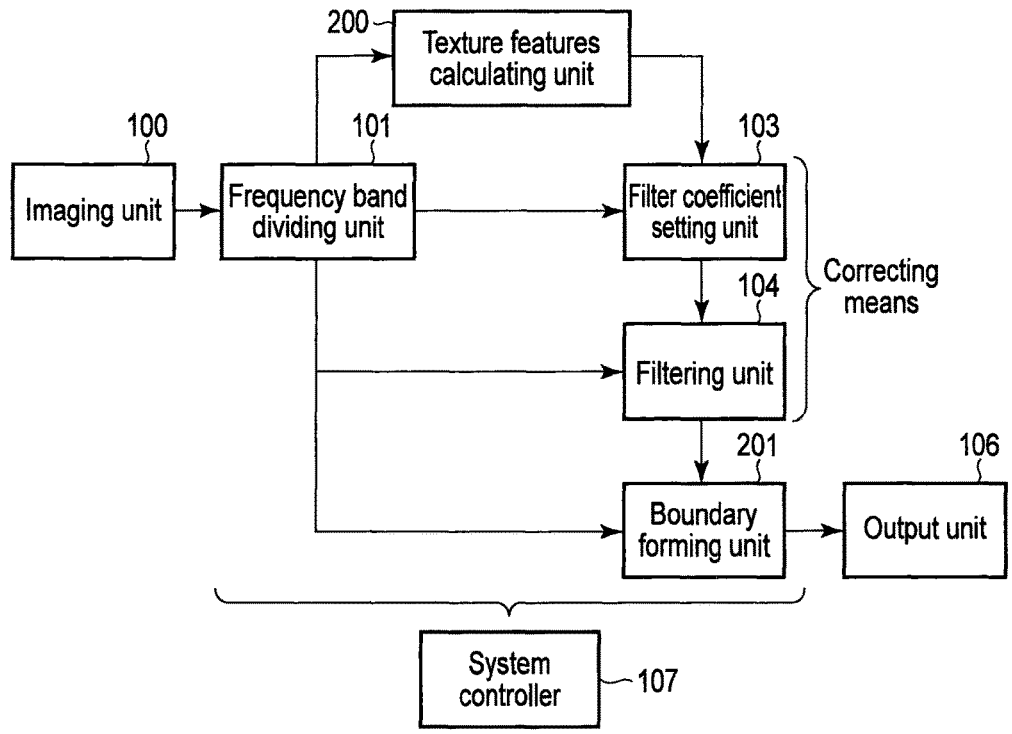
FIG. 7 is a configuration diagram showing a second embodiment of a cell contour formation apparatus according to the present invention.

FIG. 7 shows a configuration diagram of a cell contour formation apparatus. The differences between the present apparatus and the apparatus shown in FIG. 1 are a texture features calculating unit 200 and a boundary forming unit 201.

The texture features calculating unit 200 and the boundary forming unit 201 may each comprise, for example, a central processing unit (CPU) and a storage device such as a RAM or a ROM to store a calculation program. In this case, a cell contour formation program as the calculation program is stored in the ROM.

The cell contour formation program enables the CPU as a computer to perform a function to calculate a local texture features based on a histogram of luminance (pixel value) in the high frequency image H from the high frequency image H generated by the frequency band dividing unit 101, and a function to extract a rough contour showing the boundary between a cell region and a non-cell region in the high frequency image H from the frequency band dividing unit 101, perform digitalization by threshold processing for the high frequency image H' from the filtering unit 104, form a cell contour image H" in which pixels including high-band components equal to or more than a predetermined threshold constitute cell contours, and compose the rough contour with the cell contour image H" to extract a more accurate contour.

The frequency band dividing unit 101 is connected to the texture features calculating unit 200, the filter coefficient setting unit 103, the filtering unit 104, and the boundary forming unit 201. The texture features calculating unit 200 is connected to the filter coefficient setting unit 103. The filtering unit 104 is connected to the boundary forming unit 201. The boundary forming unit 201 is connected to the output unit 106.

The texture features calculating unit 200 calculates a local texture features from the high frequency image H generated from the frequency band dividing unit 101. The texture features is a features based on a histogram of luminance (pixel value) in the high frequency image H. The texture features calculating unit 200 calculates a texture features which is different from the texture features in the first embodiment and which is based on the luminance histogram of the high frequency image H.

The texture features calculating unit 200 calculates the dispersion of the luminance histogram as a measure of indicating the complexity of a texture. The texture features calculating unit 200 first sets a region of interest having a predetermined size around a pixel of interest on the high frequency image H, and then calculates a luminance histogram Hist[Lv] for the region of interest. Lv represents a luminance value (the pixel value of the high frequency image), and takes a value ranging from "0 to 255".

The texture features calculating unit 200 then calculates a pixel value average Ave in the region of interest, and calculates the dispersion (complexity) of the luminance histogram in accordance with Equation (7).

$$\text{Dispersion} = \sum_{Lv=0}^{255} (Lv - \text{Ave})^2 \times \text{Hist}[Lv]/PCall \quad (7)$$

Pcall represents the number of pixels in the region of interest. The complexity of the texture included in the region of interest is higher if the dispersion (complexity) of the luminance histogram is higher. Therefore, the texture features calculating unit 200 calculates a reciprocal (=1/dispersion (complexity) of luminance histogram) of the dispersion (complexity) of the luminance histogram, and then transfers the reciprocal to the filter coefficient setting unit 103.

The boundary forming unit 201 extracts a rough contour showing the boundary between a cell region and a non-cell region in the high frequency image H output from the frequency band dividing unit 101, and performs digitalization by threshold processing for the high frequency image H' output from the filtering unit 104 using a predetermined threshold in the same manner as in the first embodiment. The boundary forming unit 201 forms a cell contour image H" in which pixels including high frequency components equal to or more than a predetermined threshold constitute cell contours, composes the rough contour with the cell contour image H", and extracts a more accurate contour.

Figure 8:
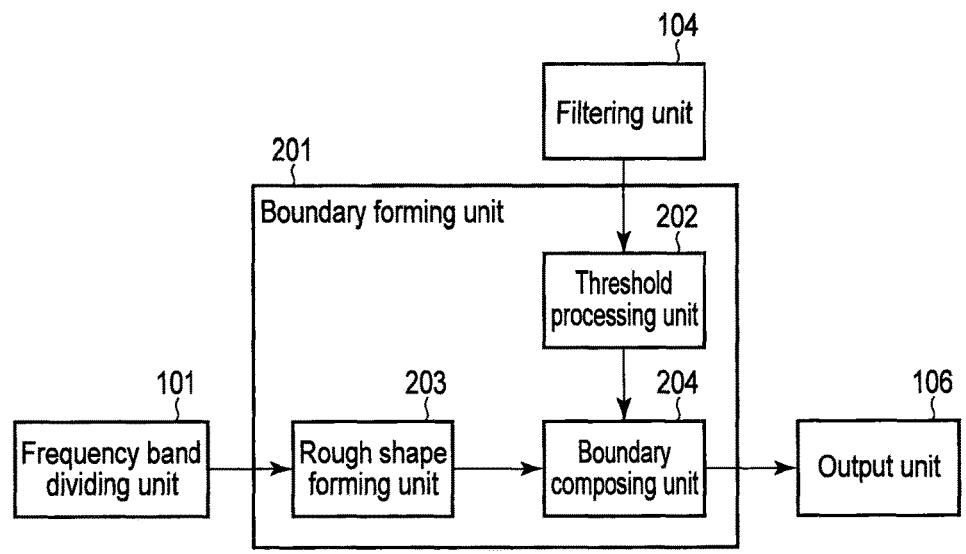
FIG. 8 is a specific configuration diagram showing a boundary formation unit in the same apparatus.

FIG. 8 shows a specific configuration diagram of the boundary forming unit 201. The boundary forming unit 201 includes a threshold processing unit 202, a rough shape forming unit 203, and a boundary composing unit 204. The frequency band dividing unit 101 is connected to the rough shape forming unit 203. The filtering unit 104 is connected to the threshold processing unit 202. Both the threshold processing unit 202 and the rough shape forming unit 203 are connected to the boundary composing unit 204. The boundary composing unit 204 is connected to the output unit 106.

The threshold processing unit 202 performs digitalization by threshold processing for the high frequency image H' after the filtering transferred from the filtering unit 104, and forms a cell contour image H" in which pixels including high frequency components equal to or more than a predetermined threshold constitute cell contours. The cell contour image H" is transferred to the boundary composing unit 204.

The rough shape forming unit 203 calculates a gradient G defined between adjacent pixels as shown in Equation (8) for the high frequency image H, and performs digitalization by a predetermined threshold.

$$G(k,l) = (L_{k,l} - L_{k+1,l})^2 + (L_{k,l} - L_{k,l+1})^2 \quad (8)$$

wherein k and l are X and Y coordinate values, and $L_{k,l}$ represents a pixel value at the coordinates k, l.

By the predetermined threshold processing for the gradient G, it is possible to relatively accurately separate large pixels as pixels included in the cell region and small pixels as pixels included in the non-cell region (background region).

The rough shape forming unit 203 performs simple morphological processing such aserosion, dilation, and filling for the digitalized image to shape a region. The rough shape forming unit 203 then forms a boundary (hereinafter referred to as rough contour A) which separates the cell region and the non-cell region by extracting a pixel having adjacent two values. The rough contour A accurately represents the boundary which separates the cell region and the non-cell region, but does not include any boundary (cell contour) existing between adjacent cells adhering to each other. The rough contour A is transferred to the boundary composing unit 204.

The boundary composing unit 204 composes the cell contour image H" with the rough contour A, and then performs predetermined morphological processing such as expansion and compression for shaping, thereby obtaining a cell contour H'". The cell contour H'" is transferred to the output unit 106.

Figure 9A:
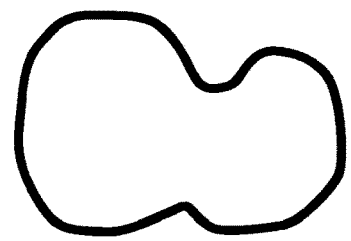
FIG. 9A is a schematic diagram showing a rough contour in composing processing for two cells adhering to each other, as a boundary composing method by a boundary composing unit in the same apparatus.
Figure 9B:
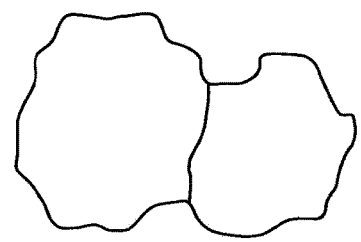
FIG. 9B is a schematic diagram showing a cell contour in composing processing for two cells adhering to each other, as the boundary composing method by the boundary composing unit in the same apparatus.
Figure 9C:
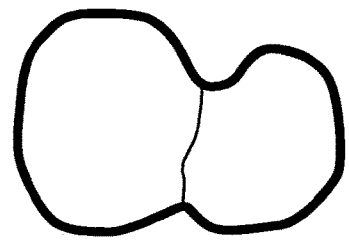
FIG. 9C is a schematic diagram showing a cell contour obtained as a result of shaping by morphological processing after the composing processing for two cells adhering to each other, as the boundary composing method by the boundary composing unit in the same apparatus.

FIG. 9A, FIG. 9B, and FIG. 9C show schematic diagrams of composing processing for two cells adhering to each other. FIG. 9A shows the rough contour A. FIG. 9B shows the cell contour H". The rough contour A does not include any contour between adjacent cells, but can accurately form a boundary between the cell region and the non-cell region. FIG. 9C shows the cell contour H'" obtained as a result of shaping by the morphological processing.

Figure 10:
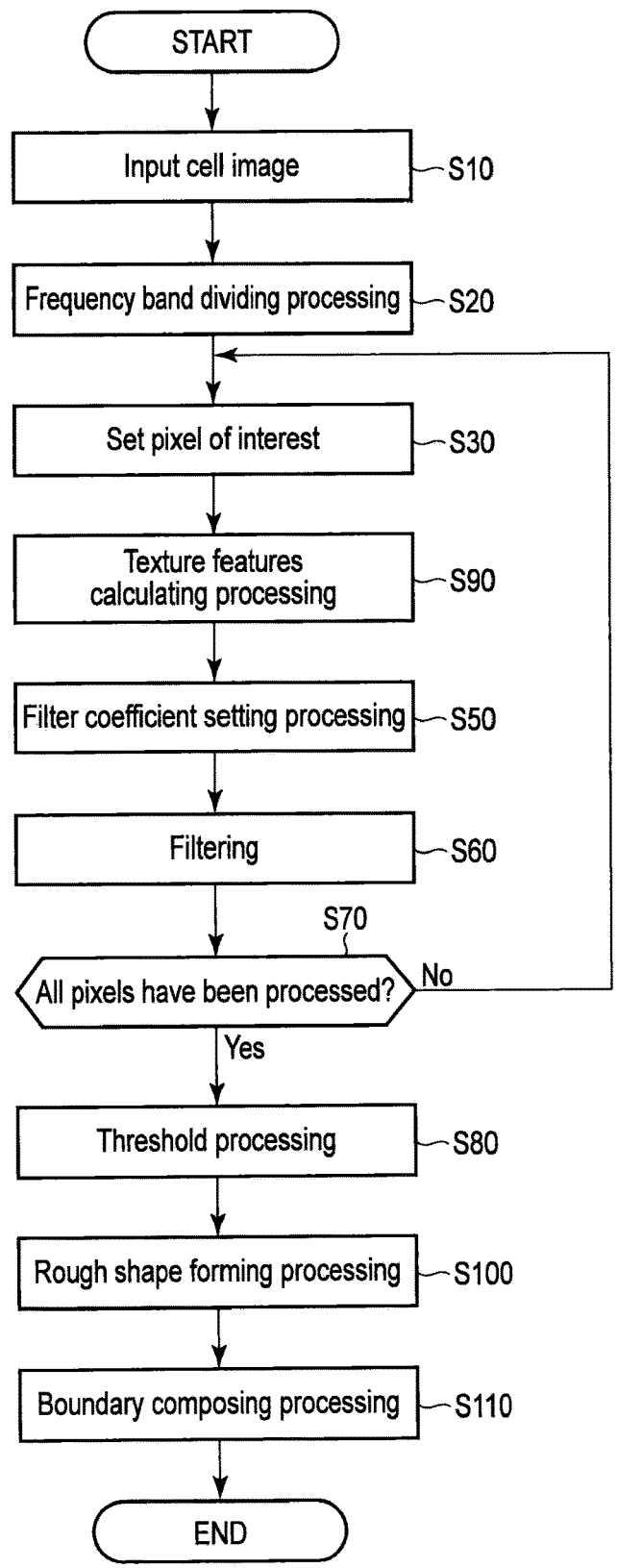
FIG. 10 is a cell contour formation flowchart of the same apparatus.

Now, the operation of the apparatus having the above configuration is described with reference to a cell contour formation flowchart shown in FIG. 10. The same steps as those in FIG. 6 are indicated by the same reference signs and are not described in detail.

In step S10, as described above, a monochrome original image signal F output from the imaging unit 100 is input to the frequency band dividing unit 101. In step S20, the frequency band dividing unit 101 performs predetermined multiple resolution decomposing processing to decompose the input monochrome original image signal F into subband images including different frequency components, for example, into two component images: a low frequency image L and a high frequency image H.

In step S30, the texture features calculating unit 200 sets a pixel of interest, and a region of interest having a predetermined size around the pixel of interest. In step S90, the texture features calculating unit 200 calculates a luminance histogram Hist[Lv] for the region of interest. As described above, Lv represents a luminance value (the pixel value of the high frequency image), and takes a value ranging from "0 to 255".

The texture features calculating unit 200 calculates a pixel value average Ave in the region of interest, and calculates the dispersion (complexity) of the luminance histogram in accordance with Equation (7). The complexity of the texture included in the region of interest is higher if the dispersion (complexity) of the luminance histogram is higher. Therefore, the texture features calculating unit 200 calculates a reciprocal (=1/dispersion (complexity) of luminance histogram) of the dispersion (complexity) of the luminance histogram, and then transfers the reciprocal to the filter coefficient setting unit 103.

In step S50, as described above, the filter coefficient setting unit 103 sets a filter coefficient for filtering the high frequency image H in the filtering unit 104, on the basis of the texture features and the pixel value of the low frequency image L.

In step S60, as described above, the filtering unit 104 filters the high frequency image H from the frequency band dividing unit 101 in accordance with the filter coefficient set in the filter coefficient setting unit 103.

In step S70, as described above, the filtering unit 104 checks whether all the pixels of the high frequency image H have been filtered. If there are pixels which have not yet been processed, the filtering unit 104 returns to step S30. If all the pixels have been processed, the filtering unit 104 proceeds to step S80.

In step S80, the threshold processing unit 202 performs digitalization by threshold processing for the high frequency image H' after the filtering transferred from the filtering unit 104, and forms a cell contour image H" in which pixels including high frequency components equal to or more than a predetermined threshold constitute cell contours. The cell contour image H" is transferred to the boundary composing unit 204.

In step S100, the rough shape forming unit 203 calculates a gradient G defined between adjacent pixels as shown in Equation (8) for the high frequency image H, and performs digitalization by a predetermined threshold. As a result, it is possible to relatively accurately separate pixels larger than the threshold as pixels included in the cell region and smaller pixels as pixels included in the non-cell region (background region).

The rough shape forming unit 203 then performs simple morphological processing such aserosion, dilation, and filling for the digitalized image to shape a region. The rough shape forming unit 203 then forms a rough contour A which separates the cell region and the non-cell region by extracting a pixel having adjacent two values. The rough contour A accurately represents the boundary which separates the cell region and the non-cell region, but does not include any boundary (cell contour) existing between adjacent cells adhering to each other. The rough contour A is transferred to the boundary composing unit 204.

In step S110, the boundary composing unit 204 composes the cell contour image H" shown in FIG. 9B with the rough contour A, and then performs predetermined morphological processing such as expansion and compression for shaping, thereby obtaining a cell contour H'" shown in FIG. 9C. The cell contour H'" is transferred to the output unit 106.

Thus, according to the second embodiment, a local texture features based on the histogram of luminance (pixel value) is calculated from the high frequency image H generated from the frequency band dividing unit 101. As a result, the high-frequency components based on the cell contours can be accurately differentiated from high-frequency components resulting from other coefficient s in accordance with the features based on the pixel value histogram. In addition to the advantageous effects according to the first embodiment, a rough contour showing the boundary between a cell region and a non-cell region in the high frequency image H from the frequency band dividing unit 101 is extracted, digitalization is performed by threshold processing for the high frequency image H' from the filtering unit 104, the cell contour image H" in which pixels including high frequency components equal to or more than a predetermined threshold constitute cell contours is formed, and the rough contour is composed with the cell contour image H", so that a more accurate contour can be extracted.

Third Embodiment

Now, a third embodiment of the present invention is described with reference to the drawings. The same parts as those in FIG. 1 are indicated by the same reference signs and are not described in detail.

Figure 11:
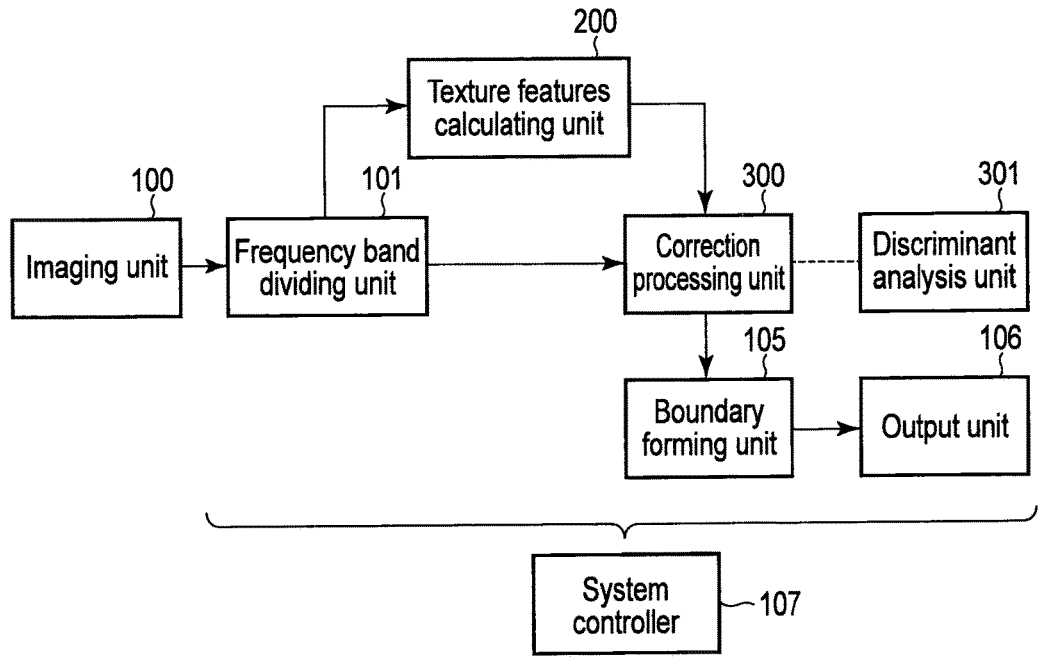
FIG. 11 is a configuration diagram showing a third embodiment of a cell contour formation apparatus according to the present invention.

FIG. 11 shows a configuration diagram of a cell contour formation apparatus. In the present apparatus, in contrast with the apparatus shown in FIG. 7, the filter coefficient setting unit 103, the filtering unit 104, and the boundary forming unit 201 are eliminated, and a correction processing unit 300 and the boundary forming unit 105 are added.

Both the frequency band dividing unit 101 and the texture features calculating unit 200 are connected to the correction processing unit 300. The correction processing unit 300 is connected to the boundary forming unit 105.

The correction processing unit 300 may be composed of, for example, a central processing unit (CPU) and a storage device such as a RAM or a ROM to store a calculation program. In this case, a cell contour formation program as the calculation program is stored in the ROM. The cell contour formation program enables the CPU as a computer to perform a function to perform correction processing based on a discriminant analysis of the high frequency image on the basis of the pixel value of the low frequency image and the texture features.

The correction processing unit 300 has a discriminant analysis unit 301 which performs the correction processing based on the discriminant analysis of the high frequency image on the basis of the pixel value of the low frequency image and the texture features.

The discriminant analysis unit 301 performs a correction based on a linear discriminant for the high frequency image H to remove unnecessary high frequencies.

The correction processing unit 300 removes unnecessary high frequencies in the high frequency image H from the frequency band dividing unit 101 on the basis of the texture features and the pixel value of the low frequency image, that is, removes unnecessary high frequencies resulting from a linear discriminant function which is a discriminant function based on a discriminant analysis. The removal of unnecessary high frequencies can be performed more easily and rapidly than the filtering.

The low frequency image L and the high frequency image H generated by the frequency band dividing unit 101 are transferred to the correction processing unit 300.

In contrast with the first and second embodiments, the correction processing unit 300 does not perform filtering, but corrects the high frequency image H on the basis of the linear discriminant processing, that is, removes unnecessary high-frequency components.

By the linear discriminant processing, the correction processing unit 300 specifies pixels which seem to have unnecessary high-frequency components resulting from microstructures inside cells or noise.

Figure 12:
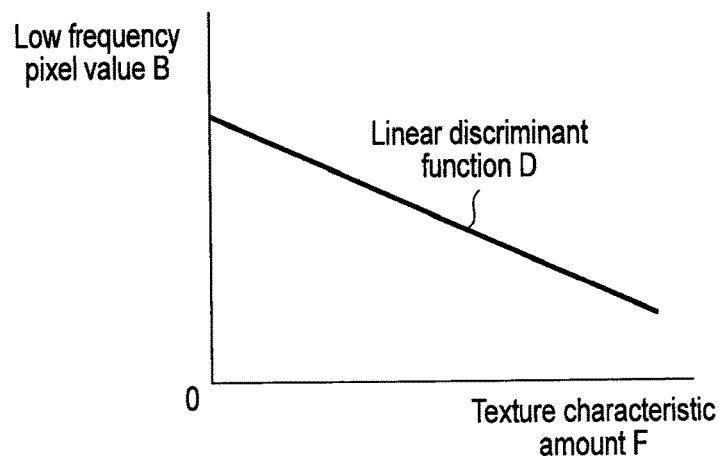
FIG. 12 is a graph showing a linear discriminant function used by a correction processing unit in the same apparatus.

The linear discriminant is performed on the basis of a calculation in Equation (9) that uses, as parameters, a texture features $F(k, l)$ found from the high frequency image H and a pixel value $B(k, l)$ of the low frequency image L, and a value $D(k, l)$ of a linear discriminant function shown in FIG. 12.

$$D(k,l)=a1+F(k,l)+a2\cdot B(k,l)+3a \qquad (9)$$

wherein k and l represent X and Y coordinates of the pixel to be discriminated. a1, a2, and a3 are predetermined constants for which fixed values experimentally found in advance are set. In the present embodiment, it is determined that $(a1, a2, a3)=(-1.25, -0.15, +1.15)$.

If the value $D(k, l)$ of the linear discriminant function is 0 or more, the texture features F is low, and the pixel value of low frequency image B is low, so that it is estimated that the pixel is not on the contour. Therefore, the correction processing unit 300 replaces, with 0, the pixel value on the high frequency image H corresponding to the coordinates of the pixel to be discriminated.

The correction processing unit 300 performs the above-described processing for all the pixels.

Figure 13:
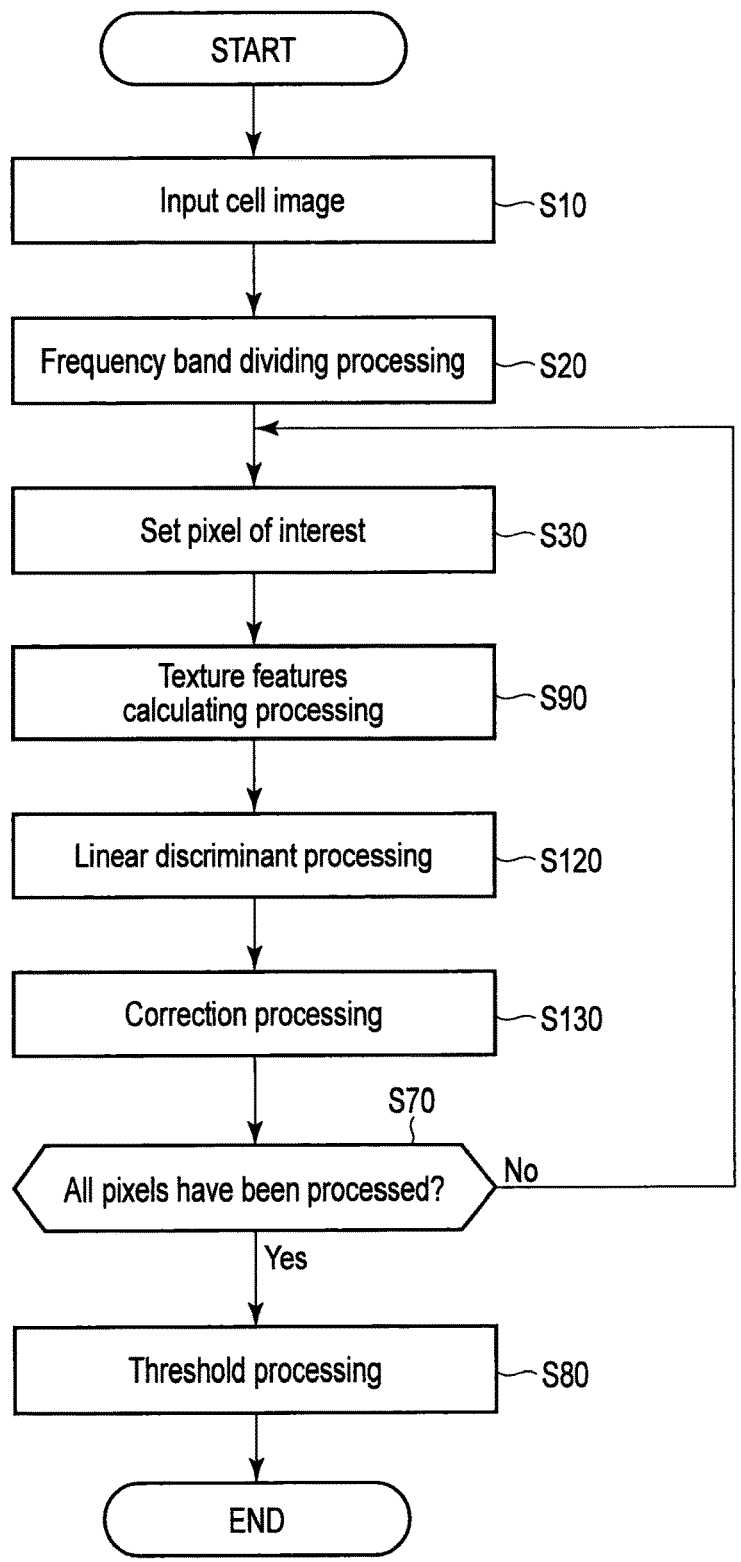
FIG. 13 is a cell contour formation flowchart of the same apparatus.

Now, the operation of the apparatus having the above configuration is described with reference to a cell contour formation flowchart shown in FIG. 13. The same steps as those in FIG. 6 and FIG. 10 are indicated by the same reference signs and are not described in detail.

In step S10, as described above, a monochrome original image signal F output from the imaging unit 100 is input to the frequency band dividing unit 101. In step S20, the frequency band dividing unit 101 performs predetermined multiple resolution decomposing processing to decompose the input monochrome original image signal F into subband images including different frequency components, for example, into two component images: a low frequency image L and a high frequency image H.

In step S30, the texture features calculating unit 200 sets a region of interest having a predetermined size around a pixel of interest. In step S39, the texture features calculating unit 200 then calculates a luminance histogram Hist[Lv] for the region of interest. The texture features calculating unit 200 calculates a pixel value average Ave in the region of interest, and calculates the dispersion (complexity) of the luminance histogram in accordance with Equation (7). The complexity of the texture included in the region of interest is higher if the dispersion (complexity) of the luminance histogram is higher. Therefore, the texture features calculating unit 200 calculates a reciprocal (=1/dispersion (complexity) of luminance histogram) of the dispersion (complexity) of the luminance histogram, and then transfers the reciprocal to the filter coefficient setting unit 103.

The correction processing unit 300 has the discriminant analysis unit 301 which performs the correction processing based on the discriminant analysis for the high frequency image on the basis of the pixel value of the low frequency image and the texture features in step S120. The discriminant analysis unit 301 performs a correction based on a linear discriminant for the high frequency image H to remove unnecessary high frequencies.

By the linear discriminant processing, the correction processing unit 300 specifies pixels which seem to have unnecessary high-frequency components resulting from microstructures inside cells or noise. The linear discriminant is performed on the basis of the calculation in Equation (9) that uses, as parameters, the texture features F(k, l) found from the high frequency image H and a pixel value B(k, l) of the low frequency image L, and the value D(k, l) of the linear discriminant function shown in FIG. 12.

If the value D(k, l) of the linear discriminant function is 0 or more, the texture features F is low, and the pixel value of low frequency image B is low, so that it is estimated that the pixel is not on the contour. Therefore, the correction processing unit 300 replaces, with 0, the pixel value on the high frequency image H corresponding to the coordinates of the pixel to be discriminated. The correction processing unit 300 performs the above-described processing for all the pixels.

In step S70, as described above, the correction processing unit 300 checks whether all the pixels of the high frequency image H have been processed. If there are pixels which have not yet been processed, the correction processing unit 300 returns to step S30. If all the pixels have been processed, the correction processing unit 300 proceeds to step S80.

In step S80, the threshold processing unit 202 performs digitalization by threshold processing for the high frequency image H' after the correction processing transferred from the correction processing unit 300, and forms a cell contour image H" in which pixels including high frequency components equal to or more than a predetermined threshold constitute cell contours. The cell contour image H" is transferred to the boundary composing unit 204.

Thus, according to the third embodiment, unnecessary high-frequencies are removed by the discriminant analysis of the high frequency image H on the basis of the pixel value of the low frequency image L and the texture features, for example, by the correction based on the linear discriminant for the high frequency image H. Therefore, the correction processing can be performed more easily and rapidly than the correction processing by, for example, filtering.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cell contour formation apparatus comprising:
   a cell image acquiring unit which images a cell group to be observed to acquire a phase difference cell image;
   a subband image creating unit which creates, from the phase difference cell image, subband images including a low frequency image comprising low-frequency components and a high frequency image comprising high-frequency components;
   a features calculating unit which calculates a local texture features from the high frequency image, the local texture features being based on at least one of (i) a feature amount, as a still image, based on randomness of a pixel value distribution in the high-band image and (ii) a feature amount based on complexity of the pixel value distribution;
   a correcting unit which corrects the high frequency image on the basis of the pixel value of the low frequency image and the texture features, wherein the correcting suppresses at least one high frequency component from the high frequency image; and
   a contour forming unit which forms contours of cells included in the cell group on the basis of the corrected high frequency image.

2. The cell contour formation apparatus according to claim 1,
   wherein the subband image creating unit includes
   a low pass filtering unit which smoothes the cell image to generate the low frequency image, and
   a high pass filtering unit which subtracts the low frequency image from the cell image to generate the high frequency image.

3. The cell contour formation apparatus according to claim 1,
   wherein the texture features includes a features based on a co-occurrence matrix of pixels in the high frequency image.

4. The cell contour formation apparatus according to claim 1,
   wherein the texture features includes a features based on a histogram of a pixel value in the high frequency image.

5. The cell contour formation apparatus according to claim 1, wherein the correcting unit includes a filter unit which filters the high frequency image on the basis of the pixel value of the low frequency image and the texture features.

6. The cell contour formation apparatus according to claim 5,
wherein the filter unit includes
a filter coefficient setting unit which sets a filter coefficient on the basis of the pixel value of the low frequency image and the texture features, and
a filtering unit which performs the filtering on the basis of the filter coefficient set by the filter coefficient setting unit.

7. The cell contour formation apparatus according to claim 5,
wherein the filtering includes nonlinear filtering.

8. The cell contour formation apparatus according to claim 1,
wherein the correcting unit includes a discriminant analysis unit which performs correction processing based on a discriminant analysis of the high frequency image on the basis of the pixel value of the low frequency image and the texture features.

9. The cell contour formation apparatus according to claim 8,
wherein the discriminant analysis unit performs a correction based on a linear discriminant for the high frequency image to remove unnecessary high frequencies.

10. The cell contour formation apparatus according to claim 1,
wherein the contour forming unit performs threshold processing for the high frequency image after the correction, and thereby forms a contour of the cell.

11. The cell contour formation apparatus according to claim 1,
wherein the contour forming unit includes
a rough shape forming unit which extracts a cell rough shape showing the contour between a cell region and a non-cell region by threshold processing for the high frequency image, and
a composing unit which composes the contour with the cell rough shape extracted by the rough shape forming unit.

12. The cell contour formation apparatus according to claim 1,
wherein the cell image includes an image acquired by a bright field microscope.

13. A cell contour formation method comprising:
imaging a cell group to be observed to acquire a phase difference cell image;
creating, from the phase difference cell image, subband images including a low frequency image comprising low-frequency components and a high frequency image comprising high-frequency components;
calculating a local texture features from the high frequency image, the local texture features being based on at least one of (i) a feature amount, as a still image, based on randomness of a pixel value distribution in the high-band image and (ii) a feature amount based on complexity of the pixel value distribution;
correcting the high frequency image on the basis of the pixel value of the low frequency image and the texture features, wherein the correcting suppresses at least one high frequency component from the high frequency image; and
forming contours of cells included in the cell group on the basis of the corrected high frequency image.

14. A non-transitory computer readable storage medium storing a cell contour formation program, the program comprising:
image a cell group to be observed to acquire a phase difference cell image;
create, from the phase difference cell image, subband images including a low frequency image comprising low-frequency components and a high frequency image comprising high-frequency components;
calculate a local texture features from the high frequency image, the local texture features being based on at least one of (i) a feature amount, as a still image, based on randomness of a pixel value distribution in the high-band image and (ii) a feature amount based on complexity of the pixel value distribution;
correct the high frequency image on the basis of the pixel value of the low frequency image and the texture features, wherein the correcting suppresses at least one high frequency component from the high frequency image; and
forming contours of cells included in the cell group on the basis of the corrected high frequency image.

15. The cell contour formation apparatus according to claim 1, further comprising a processor including the subband image creating unit, the features calculating unit, the correcting unit, and the contour forming unit.

16. The cell contour formation apparatus according to claim 1, wherein the cell image acquiring unit includes an imaging unit, an image pickup device, a CCD, an A/D converter, a camera, a bright field microscope, and/or a differential interference contrast microscope.

17. A cell contour formation apparatus comprising:
a cell image acquiring circuit which images a cell group to be observed to acquire a phase difference cell image;
a subband image creating circuit which creates, from the phase difference cell image, subband images including a low frequency image comprising low-frequency components and a high frequency image comprising high-frequency components;
a features calculating circuit which calculates a local texture features from the high frequency image, the local texture features being based on at least one of (i) a feature amount, as a still image, based on randomness of a pixel value distribution in the high-band image and (ii) a feature amount based on complexity of the pixel value distribution;
a correcting circuit which corrects the high frequency image on the basis of the pixel value of the low frequency image and the texture features, wherein the correcting suppresses at least one high frequency component from the high frequency image; and
a contour forming circuit which forms contours of cells included in the cell group on the basis of the corrected high frequency image.

* * * * *